(12) United States Patent
Leung

(10) Patent No.: US 12,708,842 B2
(45) Date of Patent: Aug. 18, 2026

(54) USER INPUT DEVICE, HANDHELD CONTROLLER AND ENTERTAINMENT SYSTEM

(71) Applicant: Sony Interactive Entertainment Inc., Tokyo (JP)

(72) Inventor: Jun Yen Leung, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 246 days.

(21) Appl. No.: 18/611,967

(22) Filed: Mar. 21, 2024

(65) Prior Publication Data

US 2024/0325880 A1 Oct. 3, 2024

(30) Foreign Application Priority Data

Mar. 28, 2023 (GB) ...................................... 2304490

(51) Int. Cl.
*A63F 13/24* (2014.01)
*A63F 13/428* (2014.01)

(52) U.S. Cl.
CPC ............ *A63F 13/24* (2014.09); *A63F 13/428* (2014.09); *A63F 2300/1043* (2013.01)

(58) Field of Classification Search
None
See application file for complete search history.

(56) References Cited

U.S. PATENT DOCUMENTS

2008/0261695 A1 10/2008 Coe
2009/0066642 A1 3/2009 Wang
2014/0094310 A1 4/2014 Bleich
(Continued)

FOREIGN PATENT DOCUMENTS

EP 0947949 A1 11/2000
JP 2000305711 A 11/2000
WO 2020217374 A1 10/2020

OTHER PUBLICATIONS

Combined Search and Examination Report for corresponding GB Application No. 2304490.2, 6 pages, dated Sep. 8, 2023.
(Continued)

*Primary Examiner* — Damon J Pierce
(74) *Attorney, Agent, or Firm* — Fish & Richardson P.C.

(57) ABSTRACT

A user input device includes: a thumbstick; a housing that partially encloses a base of the thumbstick without contacting the base so as to form a clearance between at least a part of an inner surface of the housing and at least a part of the base; and a guide for guiding the motion of the thumbstick to follow one or more distinct directions when a position of the thumbstick relative to a neutral position thereof falls within a predetermined range of thumbstick positions, at least a part of the guide being disposed within the clearance, the guide including one or more sets of interlocking elements, each set of interlocking elements including: a pin disposed on one of the inner surface of the housing and the base, and a plurality of guiding elements disposed on the other of the inner surface of the housing and the base, the plurality of guiding elements being arranged so as to form one or more paths which the pin follows when the pin is engaged with the plurality of guiding elements, the one or more paths defining the one or more distinct directions.

20 Claims, 6 Drawing Sheets

(56) References Cited

U.S. PATENT DOCUMENTS

| | | | | |
|---|---|---|---|---|
| 2016/0346681 | A1* | 12/2016 | Tsai | A63F 13/24 |
| 2017/0304717 | A1 | 10/2017 | Huang | |
| 2023/0341886 | A1* | 10/2023 | Zhong | A63F 13/98 |

OTHER PUBLICATIONS

Extended European Search Report for corresponding EP Application No. 24161717.4, 13 pages, dated Aug. 2, 2024.

* cited by examiner

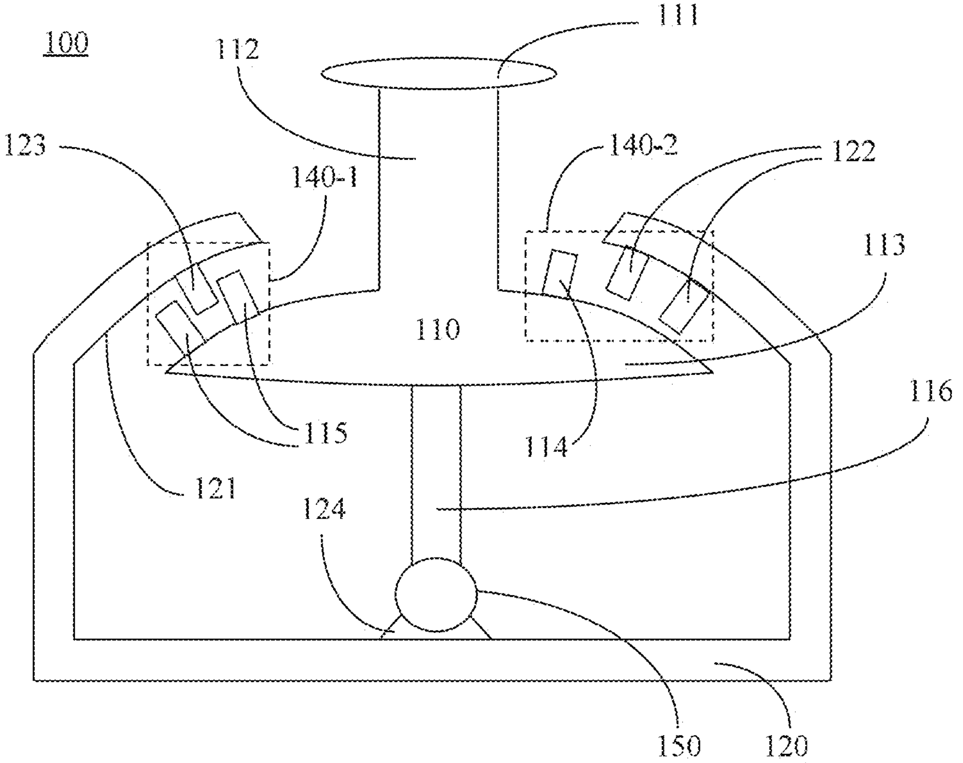
Figure 4
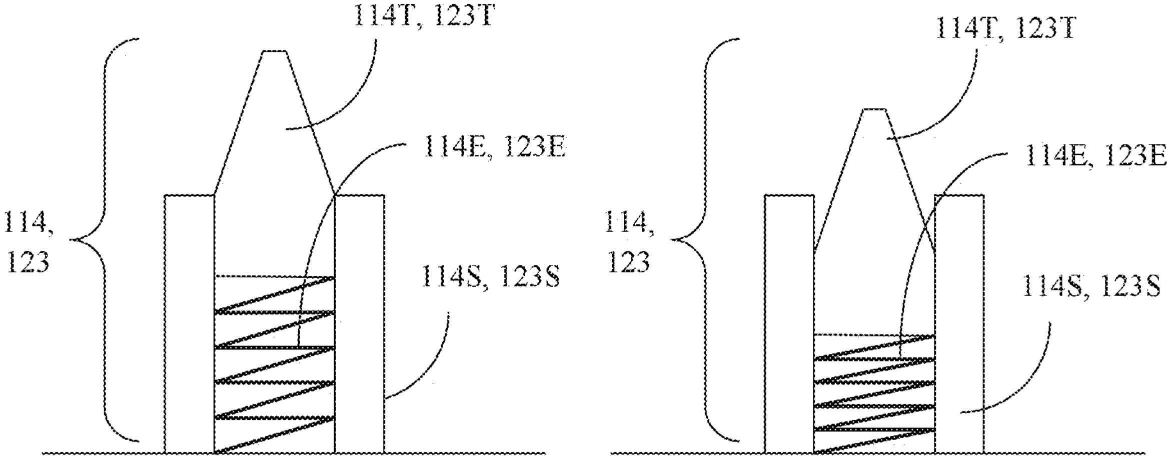
Figure 5A
Figure 5B

USER INPUT DEVICE, HANDHELD CONTROLLER AND ENTERTAINMENT SYSTEM

BACKGROUND OF THE INVENTION

Field of Invention

The present invention relates to user input devices, handheld controllers and entertainment systems.

Description of the Prior Art

While the popularity of video games has increased in recent years, some people may find said video games to be inaccessible due to motor/cognitive issues that they may have. As many of the controller inputs required in order to progress through a given video game (or otherwise experience certain moments therein) assume a full complement of motor skills, people with motor skill issues may find it difficult, if not impossible, to play the given video game.

Alternatively or in addition, users that do not possess motor skill issues may still find certain controller inputs difficult to carry out due to a high degree of accuracy associated with such inputs and/or due to such inputs being too uncomfortable to carry out.

The present invention seeks to alleviate or mitigate this issue.

SUMMARY OF THE INVENTION

In a first aspect, a user input device is provided in claim 1.

In another aspect, a handheld controller is provided in claim 13.

In another aspect, an entertainment system is provided in claim 15.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 schematically illustrates a user input device according to embodiments of the present description;

FIGS. 5A and 5B schematically illustrate a non-limiting example of a retractable pin according to embodiments of the present description;

DESCRIPTION OF THE EMBODIMENTS

A user input device, handheld controller, and entertainment system are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

As mentioned previously, users may find playing video games inaccessible due to possessing motor skill issues, a high degree accuracy being associated with certain controller inputs, and/or due to certain controller inputs being too uncomfortable to perform, for example.

As a non-limiting example, a user may be playing a fighting game. In order to make their in-game character perform a special attack, the user may be required to perform a sequence of controller inputs, where one of the required controller inputs may be the pushing of a thumbstick in a "due east" direction. This due east thumbstick movement may be associated with a high degree of accuracy; if the user does not provide a thumbstick movement that lies within, say, 2 degrees of due east, then the special attack is not performed by the in-game character.

The user may find it difficult to push the thumbstick in an exactly due east direction due to possessing motor skill issues, and/or due to such a thumb movement being uncomfortable/unnatural to the user. Thus, the user may instead push the thumbstick in an "east southeast" direction (that is, 30 degrees south of due east), and consequently not perform the desired special attack.

Thus, there is a need in the art to make the performance of controller inputs more accessible to users that possess motor skill issues and/or find certain controller input too uncomfortable to perform.

User Input Device

Figure 1A:
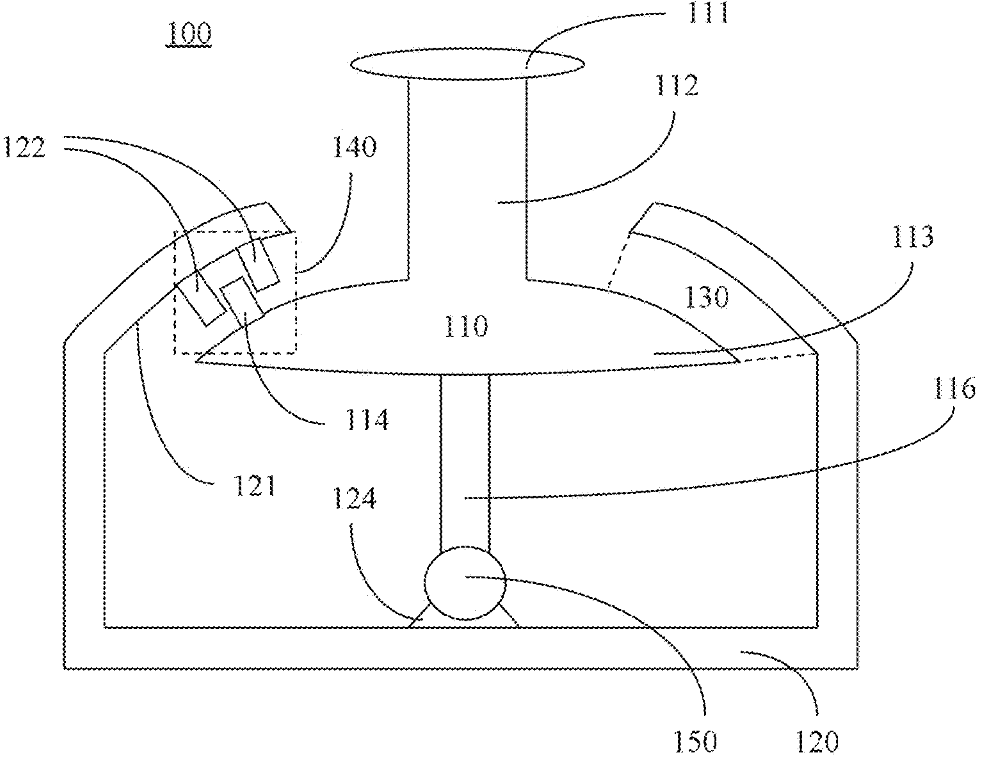
FIGS. 1A and 1B schematically illustrate a user input device according to embodiments of the present description.
Figure 1B:
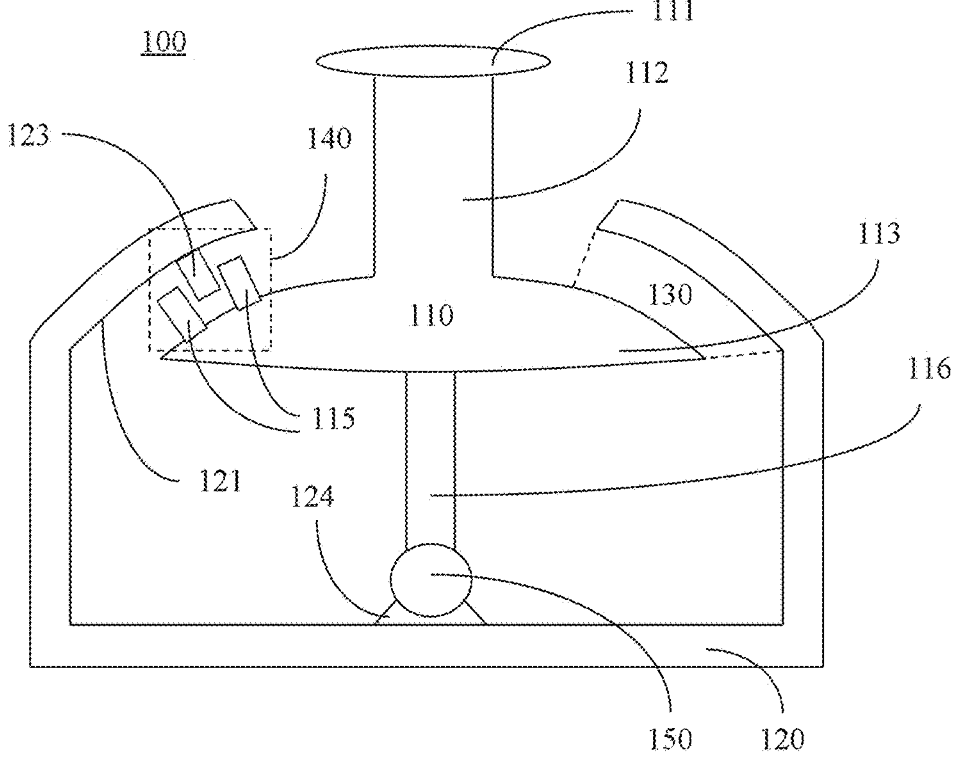

Accordingly, and turning now to FIGS. 1A and 1B, a user input device 100, comprises: a thumbstick 110; a housing 120 that partially encloses a base 113 of the thumbstick 110 without contacting the base 113 so as to form a clearance 130 between at least a part of an inner surface 121 of the housing 120 and at least a part of the base 113; and guiding means for guiding the motion of the thumbstick 110 to follow one or more distinct directions when a position of the thumbstick relative to a neutral position thereof falls within a predetermined range of thumbstick positions, at least a part of the guiding means being disposed within clearance 130, the guiding means comprising one or more sets of interlocking elements 140, each set of interlocking elements 140 comprising: a pin 114 (or, alternatively, 123) disposed on one of the inner surface 121 of the housing and the base 113, and a plurality of guiding elements 122 (or, alternatively, 115) disposed on the other of the inner surface 121 of the housing and the base 113, the plurality of guiding elements 122, 115 being arranged so as to form one or more paths which the pin 114, 123 follows when the pin is engaged with the plurality of guiding elements 122, 115, the one or more paths defining the one or more distinct directions.

Alternatively put, when the position of thumbstick 110 relative to its neutral position (that is, the position of thumbstick 110 when thumbstick 110 is not being manipulated/pushed by the user; see FIGS. 1A and 1B, for example) lies within a predetermined range of positions, thumbstick 110 may follow one or more distinct directions (such as the four cardinal directions, for example). When the relative position of thumbstick 100 no longer lies within this predetermined range, it may move in any direction.

The predetermined range of positions and the one or more distinct directions that thumbstick 110 may follow when the position thereof falls within the predetermined range are defined by the plurality of guiding elements 122, 115. Guiding elements 122, 115 may be thought of as obstacles which the pin 114, 123 has to navigate (or overcome, as will be explained later herein) when engaged with guiding elements 122, 115.

Figure 2:
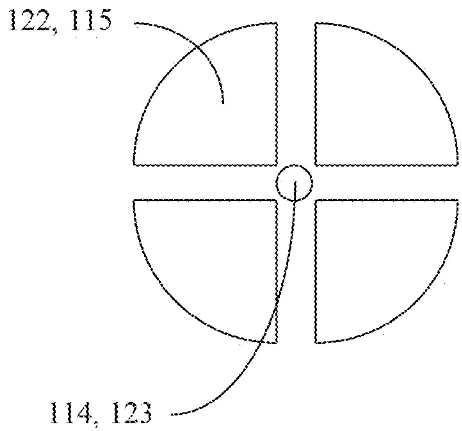
FIG. 2 schematically illustrates a non-limiting example of guiding means according to embodiments of the present description.

As a non-limiting example, guiding elements 122, 115 and pin 114, 123 may be arranged in a manner similar to that depicted in FIG. 2. As will be appreciated by persons skilled in the art, the paths formed by this arrangement of guiding elements 122, 115 define the four cardinal directions of thumbstick 100 (north, cast, south, west, for example). Thus, when pin 114, 123 is engaged with guiding elements 122, 115, pin 114, 123 may follow one of the four directions. Moreover, when pin 114, 123 is not engaged with guiding elements 122, 115, pin 114, 123 is free to move in any direction.

Hence more generally, the one or more distinct directions that thumbstick 110 follows when its position falls within the predetermined range of thumbstick positions are defined by the paths formed between guiding elements 122, 115, these paths being those which pin 114, 123 follows when engaged with guiding elements 122, 115.

As will be appreciated by persons skilled in the art, if the arrangement depicted in FIG. 2 is implemented within the embodiment depicted in FIG. 1A or 1B (where pin 114, 123 is engaged with guiding elements 122, 115 when thumbstick 110 is in its neutral position), then the predetermined range of positions shall be defined as a circular region centred on the neutral position of thumbstick 110, the radius of this circular region being based on the radius of the circular area defined by the curved surfaces of guiding elements 122, 115.

Hence more generally, the geometry of the predetermined region of the thumbstick positions may be defined by the geometry of the area covered by guiding elements 122, 115 (preferably, including the area covered by the paths formed therebetween).

Turning back to the fighting game example, if the user were to use a video game controller comprising a user input device according to embodiments of the present description, then the user may be more likely to push the thumbstick in the due cast direction in order to make their in-game character perform their special attack.

This is especially apparent in the aforementioned case of the arrangement of FIG. 2 being implemented within the embodiment depicted in FIG. 1A or 1B, where one of the distinct directions defined by the paths formed between guiding elements 122, 115 is a due cast direction, and the predetermined range of thumbstick positions within which thumbstick 110 is able to follow a distinct direction is centred on the neutral position thereof; such an arrangement would enable the user to push the thumbstick 110 in a due cast direction immediately from the neutral position thereof.

Therefore, and as will be appreciated by persons skilled in the art, embodiments of the present description make the performance of controller inputs more accessible to users, as the guiding means thereof (that is, interlocking elements 140) define one or more directions that thumbstick 110 follows when its relative position (that is, its positon relative to its neutral position) falls within a predetermined range of thumbstick positions (which is also defined by the guiding means). As a result, the guiding means aid the user in the performance of thumbstick manipulations which they may find difficult, if not impossible, to perform otherwise (due to motor skill issues, discomfort, or the like), as the user may rely on the guiding means to limit any deviation in the motion of thumbstick 110 while the user pushes thumbstick 110 in one of the directions defined by the paths between guiding elements 122, 115 (limiting north-south motion deviations as thumbstick 110 is being pushed in a due east direction to make the in-game character perform the special attack, for example).

Thumbstick

Embodiments of the present description comprise a thumbstick 110.

Turning back to FIGS. 1A and 1B, thumbstick 110 comprises base 113 and one or more pins 114 and/or one or more sets of (pluralities) of guiding elements 115 (one pin 114/set 115 for each set of interlocking elements 140) disposed on base 113. Thumbstick 110 may optionally comprise cap 111, shaft 112, and lever 116.

Cap 111 is typically the part of thumbstick 110 onto which the user rests one of their thumbs; the user typically pushes/pulls cap 111 with their thumb in order to move thumbstick 110 in the desired direction, and thus provide input signals to an entertainment device (such as a video game console, TV, sound system, or the like).

Shaft 112 typically connects cap 111 to base 113 such that any forces exerted on cap 111 (and thus the resulting motions of cap 111) are transmitted to base 113.

Base 113 typically protects one or more potentiometers (not shown) housed within user input device 100 from damage (due to dropping the user input device, for example), ingress of debris, and the like. However, in embodiments of the present description, base 113 also acts as a surface onto which one or more pins 114 and/or one or more sets (pluralities) of guiding elements 115 may be disposed. It should be noted that pin(s) 114/set(s) 115 may be disposed anywhere on the at least partially visible surface of base 113; housing 120 only partially encloses base 113 in order that shaft 112 may move in response to cap 111 being pushed/pulled on by the user's thumb.

Lever 116 typically connects base 113 to a pivot (such as pivot 150). Thus, when the user pushes/pulls on cap 111 with their thumb, thumbstick 110 rotates about pivot 150 in the direction of the pushing/pulling force exerted on cap 111. Typically, one or more potentiometers (not shown) are connected to lever 116. Thus, when lever 116 moves due to the user pushing/pulling on cap 111, the potentiometers convert the motion of lever 116 into a voltage upon which one or more input signals may be generated. These input signals may then be transmitted to the entertainment device to control the application/software being executed thereon (a video game, film, piece of music, social media, and the like).

As will be appreciated by persons skilled in the art, thumbstick 110 may thus resemble commonly known thumbsticks. However, unlike commonly known thumbsticks, thumbstick 110 comprises one or more pins 114 and/or one or more sets (pluralities) of guiding elements 115 disposed on base 113 thereof.

The manufacture of thumbstick 110 may make use of the similarities between thumbstick 110 and commonly known thumbsticks. For example, thumbstick 110 may be manufactured by firstly obtaining a commonly known thumbstick, and subsequently attaching one or more pins 114 and/or one or more sets of guiding elements 115 thereto. The attaching step may involve the use of adhesives, welding, and the like. Alternatively or in addition, pin(s) 114 and/or set(s) of guiding elements 115 may each comprise a male connector (such as a tenon, for example), and the attaching step may involve drilling one or more holes in the base of the commonly known thumbstick in order to provide one or more female connectors (mortises, for example) into which the male connectors of pin(s) 114 and/or set(s) of guiding elements 115 may be inserted.

Alternatively, the tools used to manufacture commonly known thumbsticks may be modified such that they now manufacture thumbsticks according to embodiments of the present description (such as thumbstick 110). For example, commonly known thumbsticks are typically made out of plastics, and are typically formed using some type of moulding (injection moulding, compression moulding, extrusion moulding, thermoforming, or the like). The moulds used in the manufacture of commonly known thumbsticks may be modified such that the resulting thumbsticks now possess pin(s) 114 and/or set(s) of guiding elements 115. This may be achieved by, say, drilling one or more blind holes into mould surface that corresponds to the surface of the thumbstick's base, as a non-limiting example. Thus, when molten plastic fills the negative space defined by the modified mould, a part of the molten plastic will fill the blind holes and form pin(s) 114 and/or set(s) of guiding elements 115. As will be appreciated by persons skilled in the art, this modified mould therefore enables the manufacture of thumbstick 110 with pin(s) 114 and/or set(s) of guiding elements 115 being an integral part thereof, which may be advantageous as pin(s) 114 and/or set(s) of guiding elements 115 may be less likely to break off during use of user input device 100; joints (such as adhesive bonds, welds, mortice and tenon joints, and the like) are typically sources of weakness in structures, as skilled persons will readily appreciate.

In any case, pin(s) 114 and/or set(s) of guiding elements 115 disposed on base 113 are suitable for engaging with corresponding set(s) of guiding elements 122 and/or pins 123 disposed on inner surface 121 of housing 120. This engagement enables the thumbstick 110 to move in one or more distinct directions when the relative position of thumbstick 110 lies within the predetermined range of thumbstick positions, and thus provide assistance to those users who find it difficult, if not impossible, to perform certain thumbstick inputs (pushing thumbstick 110 in a due east direction, for example).

Housing

Embodiments of the present description comprise housing 120 that partially encloses base 113 of thumbstick 110 without contacting base 113 so as to form a clearance 130 between at least a part of inner surface 121 of housing 120 and at least a part of base 113.

Turning back to FIGS. 1A and 1B, housing 120 comprises inner surface 121 and one or more sets of (pluralities) of guiding elements 122 and/or one or more pins 123 (one set 122/pin 123 for each set of interlocking elements 140) disposed on inner surface 121. Housing 120 may optionally comprise pivot housing 124. Pivot 150 may be connected with lever 116, and pivot housing 124 may connect pivot 150 with housing 120.

Whereas pin(s) 114/set(s) 115 may be disposed anywhere on the at least partially visible surface of base 113 (note that housing 120 only partially encloses base 113), set(s) 122/pin(s) 123 are to be disposed on inner surface 121 within clearance 130 formed between inner surface 121 and (the least partially visible surface of) base 113.

Clearance 130 (demarcated with dashed lines in FIGS. 1A and 1B) is a region of space formed due to the partial enclosure of housing 120 over the at least partially visible surface of base 113. As will be appreciated by persons skilled in the art, this region of space may be toroidal/annular in shape. Therefore, even though clearance 130 has only been demarcated on the right hand sides of FIGS. 1A and 1B, it also extends to the left hand sides thereof. Thus, skilled persons in the art will appreciated that interlocking elements 140 are disposed within clearance 130.

While both pin 114 and set of guiding elements 122 (and, similarly, both pin 123 and set 115) are depicted as being disposed within clearance 130 (when thumbstick 110 is in its neutral position, that is), it is only necessary for those pins and/or sets of guiding elements disposed on inner surface 121 (such as set 122 and pin 123) to be disposed within the clearance at all times. Skilled persons will appreciate that if thumbstick 110 were to be pushed towards the right hand side of FIG. 1A (or FIG. 1B), then pin 114 (or set 115) may no longer reside within the clearance, whereas set 122 (or pin 123) remains within the clearance (due to housing 120 remaining static while thumbstick 110 moves).

Figure 3:
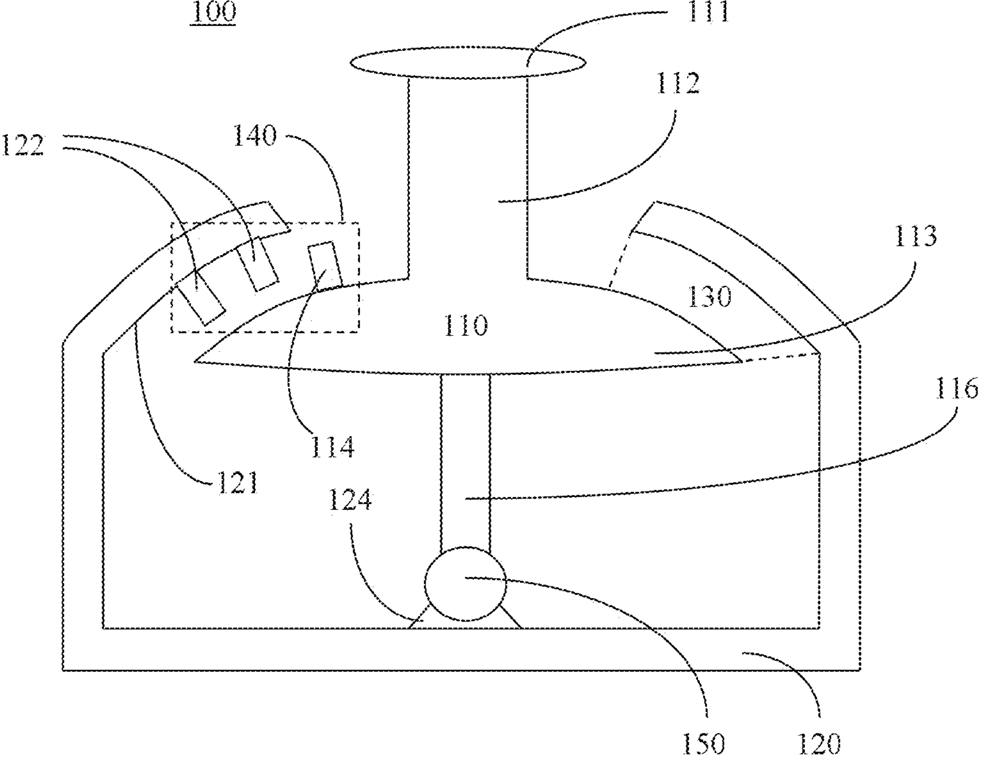
FIG. 3 schematically illustrates a user input device according to embodiments of the present description.

Similarly, pin 114 (or set 115) may not even be disposed within the clearance when thumbstick 110 is in its neutral position. As a non-limiting example, pin 114 may be disposed on base 113 such that pin 114 is visible to the user when thumbstick 110 is in its neutral position, as depicted in FIG. 3. As will be appreciated by persons skilled in the art, the arrangement depicted in FIG. 3 may result in a predetermined range of thumbstick positions (within which thumbstick 110 follows one or more distinct directions) whose centre does not coincide with the neutral position of thumbstick 110 (as was the case in the arrangements of FIGS. 1A and 1B). Rather, the centre of this predetermined range may be, say, due west of the neutral position, as pin 114 may only engage/interlock with set 122 (and thus follow the paths formed between the guiding elements 122, thereby causing thumbstick 110 to follow one or more distinct directions defined by the one or more paths) when the thumbstick 110 has first travelled in a westward direction. Locations and geometries of the predetermined range of thumbstick positions shall be discussed in greater detail later herein.

As will be appreciated by persons skilled in the art, housing 120 may thus resemble commonly known thumbstick housings. However, unlike commonly known thumbstick housings, housing 120 comprises one or more sets (pluralities) of guiding elements 122 and/or one or more pins 123 disposed on inner surface 121 thereof.

Similarly with thumbstick 110, the manufacture of housing 120 may make use of the similarities between housing 120 and commonly known thumbstick housings. Persons skilled in the art will appreciated that the previous discussion vis-à-vis the manufacture of thumbstick 110 may be applied, mutatis mutandis, to housing 120. That is to say, one or more sets of guiding elements 122 and/or one or more pins 123 may be attached to a commonly known thumbstick housing using adhesives, welds, mortise and tenon joints, or the like. Alternatively, moulds use to form commonly known thumbstick housings may be modified such that the resulting housings now possess set(s) of guiding elements 122 and/or pin(s) 123.

In any case, set(s) of guiding elements 122 and/or pin(s) 123 disposed on inner surface 121 of housing 120 are suitable for engaging with corresponding pin(s) 114 and/or set(s) of guiding elements 115 disposed on base 113. This engagement enables the thumbstick 110 to move in one or more distinct directions when the relative position of thumbstick 110 lies within the predetermined range of thumbstick positions, and thus provide assistance to those users who find it difficult, if not impossible, to perform certain thumbstick inputs (pushing thumbstick 110 in a due east direction, for example).

Guiding Means

Embodiments of the present description comprise guiding means for guiding the motion of thumbstick 110 to follow one or more distinct directions when a position of thumbstick 110 relative to a neutral position thereof falls within a predetermined range of thumbstick positions, at least a part of the guiding means being disposed within clearance 130, the guiding means comprising one or more sets of interlocking elements 140.

Moreover, in embodiments of the present description, each set of interlocking elements 140 comprises pin 114, 123 disposed on one of inner surface 121 of housing 120 and base 113, and a plurality (set) of guiding elements 122, 115 disposed on the other of inner surface 121 of housing 120 and base 113, the plurality of guiding elements 122, 115 being arranged so as to form one or more paths which the pin follows when pin 114, 123 is engaged with the plurality of guiding elements 122, 115, the one or more paths defining the one or more distinct directions.

As will be appreciated by persons skilled in the art, the at least part of the guiding means that is disposed within clearance 130 may be the one or more set(s) of guiding elements 122 and/or one or more pins 123 disposed on inner surface 121 of housing 120; as mentioned previously, the pin(s) 114 and/or set(s) 115 disposed on base 113 may not always reside within the clearance due to movement of thumbstick 110 and/or due to the locations at which the pins 114 and/or sets 115 are disposed upon base 113 (see FIG. 3, for example).

As will be appreciated by persons skilled in the art, given that pin(s) 114 and/or set(s) 115 are connected to base 113, the motion of pin(s) 114 and/or set(s) 115 when engaged with set(s) 122 and/or pin(s) 123 influences the motion of thumbstick 110. Turning back to the arrangement of FIG. 1A (which is entirely non-limiting), since pin 114 follows the one or more paths formed between the plurality of guiding elements 122 when engaged therewith, and since pin 114 is connected to base 113, the motion of pin 114 along one of the formed paths causes the thumbstick 110 to move in a similar direction to that of pin 114 (that is, in a direction that is coincident with the direction of travel of pin 114 along the one of the formed paths).

As a corollary, the location and shape and/or size (that is, geometry) of the predetermined range of thumbstick positions in which thumbstick 110 follows one or more distinct directions is defined by the location and geometry of the plurality of guiding elements 122, 115. As a non-limiting example, if the arrangement depicted in FIG. 2 is implemented within the embodiment depicted in FIG. 1A (where pin 114 is engaged with guiding elements 122 when thumbstick 110 is in its neutral position), then the predetermined range of positions shall be defined as a circular region centred on the neutral position of thumbstick 110, the radius of this circular region being based on the radius of the circular area defined by the curved surfaces of guiding elements 122.

In short, the one or more paths formed between the plurality of guiding elements 122 defines the one or more distinct directions that thumbstick 110 follows when pin 114 is engaged with the guiding elements 122 (that is, when the position of thumbstick 110 lies within the predetermined range). This is because pin 114 is connected to base 113 such that the motion of pin 114 (which follows the one or more formed paths between guiding elements 122 when engaged therewith) influences the motion of thumbstick 110.

While discussion heretofore has focused on embodiments comprising only one set of interlocking elements 140, embodiments of the present description may also comprise two, three, four, and so on, of such sets of interlocking elements 140.

As a non-limiting example, two or more similar sets of interlocking elements 140 may be implemented, and a part of each interlocking set 140 (that is, guiding elements 122/pin 123 thereof) may be disposed at different locations along inner surface 121 within clearance 130.

As will be appreciated by persons skilled in the art, the term "similar" within this context should be taken to mean that, for a given range of thumbstick positions, the pin of each interlocking set 140 is engaged with the respective plurality of guiding elements thereof, and the motion of the pin of each interlocking set 140 along one of the paths formed by the respective plurality of guiding elements thereof is not inhibited by the motion of another pin of another interlocking set 140 along one of the paths formed by the respective plurality of guiding elements thereof.

That is to say, when all pins are engaged with their respective sets of guiding elements, thumbstick 110 may be thought of as moving along two or more rails, each rail being one of the paths formed by each set of guiding elements. Like with the rails of a railroad, the paths should be similar oriented such that each pin may follow similar directions when the pins move together/simultaneously. That is to say, each interlocking set 140 should form one or more paths between its respective guiding elements that are directed/oriented in a similar manner to one or more paths formed between guiding elements of the other interlocking sets 140.

The aforementioned given range of thumbstick positions may be the predetermined range of thumbstick positions, or may be a subset thereof. In the former case, the size, shape, and arrangement of guiding elements of each interlocking set 140 are equal; the arrangement depicted in FIG. 2 may be replicated for each set of interlocking elements 140, as a non-limiting example. In the latter case, one or more paths formed between the guiding elements of one interlocking set 140 may be similar in orientation/direction to one or more paths of other interlocking sets 140, but the size/shape of the guiding elements are different to those of the other interlocking set 140. For example, the arrangement of FIG. 2 may be replicated for each set of interlocking elements 140, yet for one of the interlocking sets 140, the size of the guiding elements is reduced.

It may be advantageous to employ two or more similar interlocking sets 140 in order to reduce the likelihood of pins/guiding elements breaking during use. This is because the force exerted on the thumbstick may be transmitted through two or more pins and/or two or more sets of guiding elements (as opposed to only one pin or set of guiding elements). Consequently, the surface area of contact (that is, the contact area) between pins and guiding elements (if any arises during use) increases, thereby reducing the amount of mechanical stresses experienced by each pin/guiding element.

Such stress reduction may be required throughout the predetermined range of thumbstick positions, or may only be required in a subset of the predetermined range (a subset comprising a junction between paths, for example). In any case, skilled person will appreciate that the aforementioned given range of thumbstick positions is the range of thumbstick positions in which the aforementioned stress reduction takes effect, due to the concurrent contact of each of two or more pins with their respective set of guiding elements.

Hence more generally, in embodiments of the present description, for each set of interlocking elements 140, the respective plurality of guiding elements 122, 115 thereof are disposed within a respective predetermined area of the other of inner surface 122 of housing 120 and base 113, wherein a location and a geometry of the respective predetermined area defines a location and a geometry of at least a part of the predetermined range of thumbstick positions. Preferably, a respective predetermined area is inclusive of the paths formed between a respective plurality of guiding elements 122, 115.

Alternatively or in addition, two or more different sets of interlocking elements 140 may be implemented, and a part of each interlocking set 140 (that is, guiding elements 122/pin 123 thereof) may be disposed at different locations along inner surface 121 within clearance 130.

As will be appreciated by persons skilled in the art, the term "different" within this context should be taken to mean that a set of interlocking elements 140 defines a predetermined range of thumbstick positions that is separate from another predetermined range of thumbstick positions of another set of interlocking elements. The term "separate" should be taken to mean that the predetermined ranges do not overlap with each other, and that one predetermined range is not a subset of another predetermined range.

Turning now to FIG. 4, two different sets of interlocking elements 140 (that is interlocking sets 140-1 and 140-2) have been implemented. For interlocking set 140-1, pin 123 thereof is engaged with guiding elements 115 thereof when thumbstick 110 is at its neutral position. For interlocking set 140-2, pin 114 thereof is not engaged with guiding elements thereof when thumbstick 110 is at its neutral position, but may be engaged therewith when thumbstick 110 is pushed towards the right hand side of the page (in a due cast direction, for example).

As such, a first predetermined range of thumbstick positions (within which thumbstick 110 follows one or more distinct directions) is centred on the neutral position, the first interlocking set 140-1 having defined this first predetermined range by way of the arrangement of its guiding elements 115. Moreover, a second predetermined range of thumbstick positions is centred on a thumbstick position due cast of the neutral position, the second interlocking set 140-2 having defined this second predetermined range by way of the arrangement of its guiding elements 122.

The distance of pin 114 from guiding elements 122 is such that pin 114 can only become engaged with elements 12 when pin 123 is disengaged from guiding elements 115. Thus, the first and second predetermined ranges of thumbstick positions are separate; there is no overlap between the predetermined ranges, nor is one predetermined range a subset of the other. Moreover, it should be noted that the separate sets of interlocking elements 140 may define one or more similar thumbstick directions for the respective pins thereof to follow. Alternatively, each separate interlocking set 140 may define one or more thumbstick directions that are different from the thumbstick directions defined by the other separate interlocking sets 140.

This is in contrast to the aforementioned similar sets of interlocking elements 140, as the similar interlocking sets 140 only define one or more similar thumbstick directions for the respective pins thereof to follow (note the railroad analogy), and either define the same predetermined range of thumbstick motions, or one predetermined range is a subset of another (which ultimately results in the largest predetermined range being the de facto predetermined range for thumbstick 110).

Hence more generally, in embodiments of the present description, the guiding mean may be suitable for guiding the motion of thumbstick 110 to follow one or more distinct directions when a position of the thumbstick relative to a neutral position thereof falls within one of a plurality of separate predetermined ranges of thumbstick positions, wherein the guiding means comprises two or more sets of interlocking elements 140-1, 140-2 wherein, for each set of interlocking elements 140-1, 140-2 the respective plurality of guiding elements 122, 115 thereof are disposed within a respective predetermined area of the other of inner surface 121 of housing 120 and the base 113, wherein a location and a geometry of the respective predetermined area defines a location and a geometry of a respective one of the plurality of separate predetermined ranges of thumbstick positions. Preferably, a respective predetermined area is inclusive of the paths formed between a respective plurality of guiding elements 122, 115.

Having two or more separate predetermined ranges may be advantageous in that a greater amount of assistance may be afforded to users that possess motor skill issues and/or find certain controller input too uncomfortable to perform. Turning to the arrangement depicted in FIG. 4, the first interlocking set 140-1 may aid the user to push/pull the thumbstick in, say, a cardinal direction (due cast, for example) when the thumbstick is in the neutral position, and the second interlocking set 140-2 may aid the user to push/pull the thumbstick in, say, an ordinal direction (south west, for example) when the thumbstick is in a position due cast of the neutral position.

These two aforementioned thumbstick directions may be required by an application/software in order to affect/change the state thereof. For example, a fighting video game may require a rapid succession of thumbstick motions where the thumbstick must reach a first position due cast of the neutral position and then reach a second position due south of the neutral position in order to make an in-game character perform a special attack. For some users this the accurate performance of this quick succession of thumbstick motions may be difficult, if not impossible, to achieve due to motor skill issues and/or discomfort. As will be appreciated by persons skilled in the art, the two aforementioned separate interlocking sets 140-1, 140-2 may enable the user to perform this quick succession of thumbstick motions, as the first set 140-1 may enable the initial due cast motion to be carried out accurately, and the second set 140-2 may enable the subsequent south west motion towards a position due south of the neutral position.

It should be noted that in order to facilitate such quick movements, one of the paths defined in second set 140-2 may be oriented in an east-west direction so that the pin 114 (which is travelling in an eastward direction) may successfully engage with guiding elements 122 before being moved in a south west direction.

On this note and more generally, if (one of) the set(s) of interlocking elements 140 define(s) a predetermined range of thumbstick positions that is "off-centre" so to speak (that is, the predetermined area is not centred on the neutral position), then it may be beneficial to increase the likelihood of the pin thereof successfully engaging with the guiding elements thereof on the first attempt.

One way to increase this likelihood is to ensure that one of the paths of the "off-centre" interlocking set 140 is oriented in a direction that coincides with the most likely direction of travel of the pin; an interlocking set 140 whose predetermined range of thumbstick positions is centred on a position due east of the neutral position may define a path that is oriented in an east-west direction so that the pin thereof (which is travelling in an eastward direction) may successfully engage with guiding elements thereof, as alluded to previously.

Alternatively or in addition, one or more of the paths defined in an off-centre interlocking set 140 may be tapered such that the path is widest at its mouth. It should be noted that the "mouth" of a path is the limit of the path beyond which the pin becomes disengaged from the guiding elements (that is, no longer within the predetermined area defined by the guiding elements) if the pin was previously engaged therewith, or the limit of the path beyond which the pin becomes engaged with the guiding elements (that is, now within the predetermined area defined by the guiding elements) if the pin was previously disengaged therefrom.

Alternatively or in addition, for at least one of interlocking elements 140, at least one of the pin 114, 123 thereof and the plurality of guiding elements 122, 115 thereof comprise one or more rounded or chamfered edges. As will be appreciated by persons skilled in the art, such rounding/chamfering of the guiding elements' edges may widen the mouth of the paths, and thus increase the likelihood of successful engagement of pin and guiding elements on the first attempt. Similarly, the rounding/chamfering of the pin's edges may reduce the width of the side of the pin that faces the direction of travel of the pin, thereby increasing the likelihood of successful engagement of pin and guiding elements on the first attempt.

Turning now to the interaction between pins and sets of guiding elements once engaged with each other, a given pin 114, 123 may not follow the one or more paths defined by its respective guiding elements 122, 115 if the user pushes/pulls thumbstick 110 in a direction that does not coincide with the paths with an amount of force sufficient to cause the given pin 114, 123 to move over the tip of at least one of the plurality of guiding elements 122, 115.

That is to say that optionally, for at least one set of interlocking elements 140, the respective pin 114, 123 thereof, when engaged with the respective plurality of guiding elements 122, 115 thereof, does not follow the one or more paths formed by the respective plurality of guiding elements 122, 115 thereof if a force exerted on thumbstick 110 is greater than or equal to a threshold force exerted on thumbstick 110, and if a direction of the force exerted on thumbstick 110 does not coincide with the one or more distinct directions defined by the one or more paths.

It may be advantageous to enable a given pin to overcome its respective guiding elements (that is, not follow the paths formed by the respective guiding elements) as doing so enables the user to choose when to use the assistance provided by embodiments of the present description.

Turning to the fighting game example, at a first point in time during the gaming session, the user may choose to make use of the thumbstick motion assistance provided by embodiments of the present description in order to accurately perform a due east thumbstick motion so as to cause their in-game character to perform the special attack. However, at a second (later) point in time during the game session, the user may want to make their in-game character avoid the blows being dealt by the enemy character and may thus want to push/pull thumbstick 110, while pin 114, 123 is engaged with guiding elements 122, 115, in a direction that does not coincide with the paths formed by guiding elements 122, 115. In this case, the user may push/pull thumbstick 110 in said direction with an amount of force that is greater than or equal to the threshold force, and thus cause pin 114, 123 to move over (overcome) any guiding elements that are in the way of pin 114, 123 (that is, those guiding elements that obstruct pin 114, 123 while it travels in a direction coincident with that of thumbstick 110).

Preferably, the aforementioned threshold amount of force may be made less than the yield strength of the material used in pin 114, 123 and the material used in guiding elements 122, 115 (such materials may or may not be different from each other) in order to prevent/reduce the likelihood of pin 114, 123 and/or guiding elements 122, 115 undergoing plastic (that is, permanent) deformation while pin 114, 123 overcomes the obstructing guiding elements 122, 115. Were such plastic deformation to occur, then pin 114, 123 may not be able to successfully engage/disengage with guiding elements 122, 115 in subsequent uses of user input device 100, therefore preventing the provision of the thumbstick motion assistance in those subsequent uses.

In any case, and as will be appreciated by persons skilled in the art, the threshold amount (magnitude) of force is such that the tip of pin 114, 123 starts to move over (overcome) the tip of obstructing guiding element 122, 115.

One way in which a threshold magnitude of force exerted on thumbstick 110 causes the onset of this overcoming of obstructing guiding element 122, 115 by pin 114, 123 may be that pin 114, 123 and/or obstructing guiding element 122, 115 elastically deform/move in response to a threshold magnitude of a contact force arising therebetween. As will be appreciated by persons skilled in the art, this contact force arises due to the force exerted on thumbstick 110, as pin 114 and/or obstructing guiding element 115 are mechanically connected to thumbstick 110.

The elastic deformation/movement may cause the area of contact between a side wall of pin 114, 123 and a side wall of obstructing guiding element 122, 115 to reduce, thereby permitting pin 114, 123 to move over obstructing guiding element 122, 115.

This is all to say that optionally, for the at least one set of interlocking elements 140, at least one of the respective pin 114, 123 thereof and the respective plurality of guiding elements 122, 115 thereof are movable or elastically deformable so as to enable at least a part of a tip of the respective pin 114, 123 thereof to move over at least a part of a tip of at least one of the respective plurality of guiding elements 122, 115 when the force exerted on thumbstick 110 is greater than or equal to the threshold force exerted on thumbstick 110 and when the direction of the force exerted on thumbstick 110 does not coincide with the one or more distinct directions defined by the one or more paths.

Regarding movability, pin(s) 114, 123 and/or (sets of) guiding elements 122, 115 may comprise a telescopic/retractable structure, as depicted in FIGS. 5A and 5B. As can be seen in FIG. 5A, pin 114, 123 may comprise a tapered tip 114T, 123T disposed within a hollow shaft 114S, 123S. Shaft 114S, 123S may house an elastic member 114E, 123E (which may be a spring, a piece of rubber, a piece of foam, or the like). When a threshold amount of contact force between pin 114, 123 and obstructing guiding element 122, 115 arises, the tapered shape of tip 114T, 123T thereof may enable the tip to travel into the hollow shaft, as is depicted in FIG. 5B. Due to this retraction of tip 114T, 123T, the amount of contact area between pin 114, 123 and obstructing guiding element 122, 115 may reduce, thus enabling tip 114T, 123T to move over obstructing guiding element 122, 115. As will be appreciated by persons skilled in the art, elastic member 114E, 123E may enable tip 114T, 123T to return to its original height after tip 114T, 123T has moved over obstructing guiding element 122, 115.

Regarding deformability, pin(s) 114, 123 and/or (sets of) guiding elements 122, 115 may be configured to bend and/or shear in response to a threshold magnitude of a contact force arising therebetween, thereby permitting pin 114, 123 to move over obstructing guiding element 122, 115 due to the bending and/or shearing causing a reduction in the amount of contact area therebetween.

As will be appreciated by persons skilled in the art, the threshold magnitude of a contact force (and, in turn, the threshold amount of force exerted on thumbstick 110) may be derived from the material/mechanical/geometric properties of pin(s) 114, 123 and/or (sets of) guiding elements 122, 115. As a non-limiting example, the threshold contact force may be derived from the modulus of elasticity (that is, Young's modulus and/or shear modulus), cross sectional area/second moment of arca, and length of pin(s) 114, 123 (or parts thereof; elastic member 114E, 123E, for example) and/or (sets of) guiding elements 122, 115 (or parts thereof), as these properties typically defines the stiffness (that is, the resistance to bending and/or shearing in response to an applied force) of pin(s) 114, 123 (or parts thereof) and/or (sets of) guiding elements 122, 115 (or parts thereof).

Additionally, the threshold contact force (and, in turn, the threshold amount of force exerted on thumbstick 110) may be derived from yet other properties of pin(s) 114, 123 and/or (sets of) guiding elements 122, 115. For example, the threshold contact force may be derived from the coefficient of friction between pin(s) 114, 123 and/or (sets of) guiding elements 122, 115 and/or between respective parts of a pin 114, 123 or guiding element 122, 115 (if a telescopic/retractable structure is employed, for example).

Alternatively or in addition to movable/deformable pins and/or guiding elements, base 113 may move along lever 116 towards pivot 150 so as to reduce the contact area between pin 114, 123 and obstructing guiding element 122, 115, and thereby enable pin 114, 123 to move over (overcome) obstructing guiding element 122, 115. In order to enable base 113 to return to its original height (that is, distance away from pivot 150), an elastic member (such as a spring, for example) may be disposed between base 113 and pivot 150, for example.

That is to say that optionally, embodiments of the present description may comprise pivot 150, wherein thumbstick 110 is connected to housing 120 via pivot 150; and biasing means for biasing a height of base 113 of thumbstick 110 relative to pivot 150 towards a predetermined height, wherein the biasing means allow the at least part of the tip of the respective pin 114, 123 to move over the at least part of the tip of the at least one of the respective plurality of guiding elements 122,115 by allowing the height of base 113 of thumbstick 110 to change from the predetermined height when the force exerted on thumbstick 110 is greater than or equal to the threshold force exerted on thumbstick 110 and when the direction of the force exerted on thumbstick 110 does not coincide with the one or more distinct directions defined by the one or more paths.

As will be appreciated by persons skilled in the art, the phrase "thumbstick 110 is connected to housing 120 via pivot 150" should be taken to mean that one or more other components may or may not be connected between pivot 150 and thumbstick 110 and/or one or more other components may or may not be connected between pivot 150 and housing 120. For example, and as mentioned previously, housing 120 may comprise pivot housing 124 which connects pivot 150 to housing 120, and thumbstick 110 may comprise lever 116 that connects thumbstick 110 to pivot 150.

Figure 6:
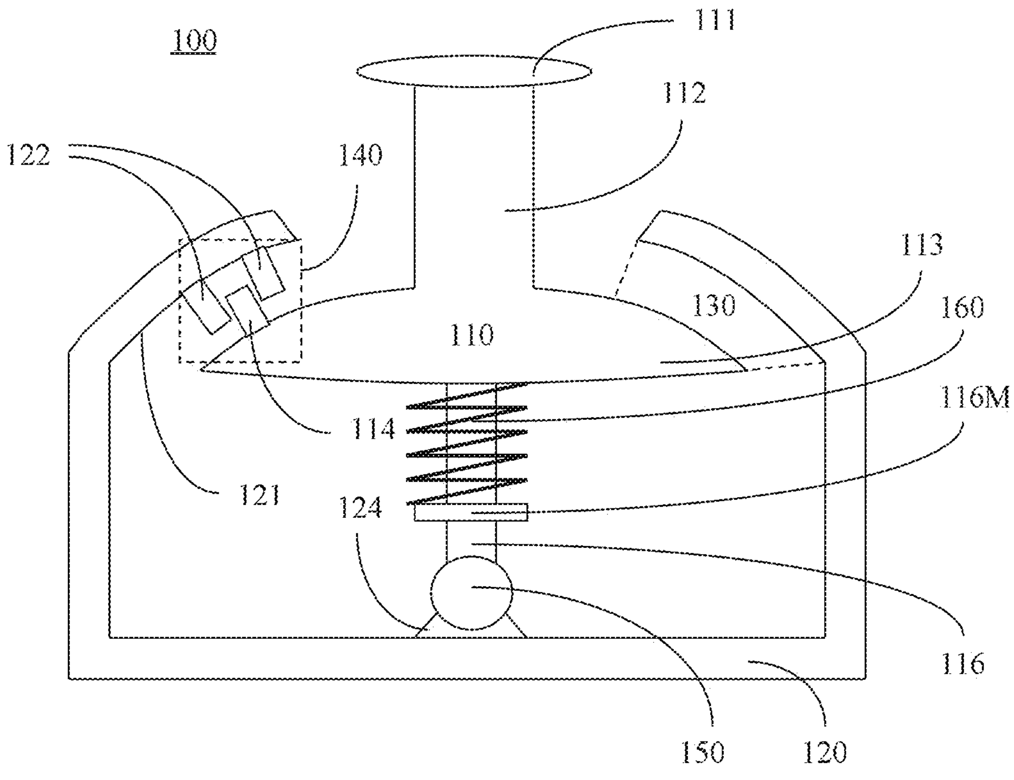
FIG. 6 schematically illustrates a user input device according to embodiments of the present description.

As a non-limiting example of biasing means, an elastic member (such as a spring, for example) may be mounted between base 113 and lever 116, as depicted in FIG. 6. As can be seen in FIG. 6, lever 116 may comprise a mounting portion 116M which enables one end of elastic member 160 to be affixed/abutted thereto. The other end of elastic member 160 may be affixed/abutted to the underside of base 113 (that is, the surface of base 113 that faces pivot 150). Shaft 112 may be hollow so as to allow lever 116 to move within shaft 122 when the height of base 113 relative to pivot 150 changes. It should be noted that elastic member 160 does not need to be mounted such that elastic member 160 shares a common axis with lever 116; elastic member 160 may be mounted adjacent to lever 116, with one end affixed/abutted to mounting portion 116M and the underside of base 113.

As will be appreciated by persons skilled in the art, the discussion vis-à-vis movable pins/guiding elements (that is, the discussion with regards to FIGS. 5A and 5B) may be applied, mutatis mutandis, to the biasing means. This is because, like with telescopic/retractable pins/guiding elements, the change in height of base 113 in response to a threshold amount contact force between pin 114, 123 and obstructing guiding element 122, 115 reduces the contact area between pin 114, 123 and obstructing guiding element 122, 115, thereby enabling tip 114T, 123T to move over obstructing guiding element 122, 115. Like with the telescopic/retractable pins/guiding elements, the arrangement depicted in FIG. 6 may comprise tapered pin(s) 114, 123 and/or (sets of) guiding elements 122, 115 so as to enable the height of pin 114 or obstructing guiding element 115 (and thus the height of base 113) to change in response to the threshold contact force.

When a threshold amount of contact force between pin 114, 123 and obstructing guiding element 122, 115 arises, the tapered shape of tip 114T, 123T thereof may enable the tip to travel into the hollow shaft, as is depicted in FIG. 5B. Due to this retraction of tip 114T, 123T, the amount of contact area between pin 114, 123 and obstructing guiding element 122, 115 may reduce, thus enabling tip 114T, 123T to move over obstructing guiding element 122, 115.

Alternatively (or in addition, as shall be discussed later herein), a given pin 114, 123 may be constrained to follow the one or more paths defined by its respective guiding elements 122, 115.

That is to say that optionally, for at least one set of interlocking elements 140, the respective pin 114, 123 thereof, when engaged with the respective plurality of guiding elements 122, 115 thereof, may be constrained to follow the one or more formed by the respective plurality of guiding elements 122, 115 thereof regardless of a magnitude and/or direction of a force exerted on the thumbstick.

It may be advantageous to constrain a given pin to follow the paths formed by its respective guiding elements as doing so may provide continual assistance to users who require continual thumbstick motion assistance within specific ranges of thumbstick position.

Turning back to the fighting game example, the majority of actions performable by the user's in-game character may only be perform if one of the associated inputs provided by the user is a thumbstick motion in a cardinal direction. Moreover, the user may find that, due to their motor skill issues/discomfort, they require continual assistance in pushing/pulling thumbstick 110 from its neutral positon in one of the four cardinal directions. Thus, by constraining the pin 114, 123 to follow one or more cardinally-oriented paths formed by guiding elements 122, 115 (such as those guiding elements 122, 115 depicted in FIG. 2) when thumbstick 110 is within a predetermined range centre on the neutral position (such as that defined by the interlocking set 140 of FIG. 1A or 1B), the user is provided with continual thumbstick motion assistance for the cardinal thumbstick motions required by the fighting game.

The constraints imposed by such interlocking sets 140 may be due to the amount of contact area between pin 114, 123 and obstructing guiding elements 122, 115 being too great for pin 114, 123 to move over obstructing guiding elements 122, 115 despite any bending/moving of pin 114, 123 and/or obstructing guiding elements 122, 115 in response to the contact force therebetween.

Alternatively or in addition, the material/mechanical/geometric properties of pin 114, 123 and/or obstructing guiding elements 122, 115 may be such that the resultant degree of bending/movement of pin 114, 123 and/or obstructing guiding elements 122, 115 in response to the contact force therebetween is too small to enable a sufficient reduction in contact area therebetween, and thus enable pin 114, 123 to move over obstructing guiding elements 122, 115.

As will be appreciated by persons skilled in the art, given that multiple separate sets of interlocking elements 140 may be implemented within embodiments of the present description, one or more of the multiple separate interlocking sets 140 may comprise deformable/movable pin(s) 114, 123 and/or (sets of) guiding elements 122, 115 and one or more of the multiple separate interlocking sets 140 may comprise constraining pin(s) 114, 123 and/or (sets of) guiding elements 122, 115. Turning back to FIG. 4, interlocking set 140-1 may be a constraining interlocking set 140, whereas interlocking set 140-2 may be a deformable/movable interlocking set 140, as a non-limiting example. Turning back to the fighting game example, the user may be provided with continual thumbstick motion assistance for the cardinal thumbstick motions required by the fighting game, whereas the user may choose to utilise the thumbstick motion assistance provided by interlocking set 140-2 if they need to perform a quick succession of thumbstick motions for their in-game character's special attack (due east thumbstick positon quickly followed by a due south thumbstick position, as mentioned previously, for example).

Optionally, for at least one set of interlocking elements 140 (regardless of whether that at least one interlocking set 140 is a constraining set or a deformable/movable set), at least one of the pin 114, 123 thereof and the plurality of guiding elements 122, 115 thereof may comprise a rounded or chamfered tip.

Regarding deformable/movable sets, this rounding/chamfering may be thought as similar to the aforementioned tapered pins/guiding elements which enable movement of pin 114, 123 over obstructing guiding element 122, 115. As such, discussions vis-à-vis tapered tips of pins/guiding elements may be applied to rounded/chamfered tips, mutatis mutandis. Regarding constraining sets, this rounding/chamfering may make the manufacturing of such sets more resource efficient, as less material may be used to form such rounded/chamfered pins 114, 123 and/or rounded/chamfered guiding elements 122, 115.

In any case, and optionally, for a given set of interlocking elements 140, the one or more paths formed by the respective plurality of guiding elements 122, 115 thereof may comprise one or more predefined patterns.

As a non-limiting example of predefined patterns, one of the predefined patterns may comprise a cross defining cardinal directions for thumbstick 110 to follow within the predetermined range of thumbstick position. A non-limiting example of such cross-shaped paths may be seen in FIG. 2.

It should be noted that the term "cardinal direction" within the context of the present description should be taken to mean one of four orthogonal directions in which thumbstick 110 may move. These four orthogonal directions are typically known as (due) north, (due) east, due (south) and (due) west. For a conventional thumbstick comprised within a conventional games controller, due north is typically taken to mean the thumbstick direction that is normal to and oriented towards the side of the conventional controller that houses the shoulder buttons of the conventional controller.

Thus, for embodiments of the present description, if user input device 100 were to be comprised within a conventional games controller, then the thumbstick direction that is normal to and oriented towards the side of the conventional controller that houses the shoulder buttons of the conventional controller should be taken to mean due north for thumbstick 110.

Alternatively or in addition, one of the predefined patterns may comprise a saltire defining ordinal directions for the thumbstick to follow within the predetermined range of thumbstick position. A non-limiting example of such saltire-shaped paths may be seen in FIG. 7.

It should be noted that the term "ordinal direction" within the context of the present description should be taken to mean one of four orthogonal directions in which thumbstick 110 may move. These four orthogonal directions are typically known as north west, north east, south east and south west, with (due) north having been defined previously.

The cardinal and ordinal directions are typically the most used thumbstick directions in video games. This is due to such thumbstick directions being easily depicted as horizontal, vertical and/or diagonal arrows in the help menus of such video games (such help menus typically help the user understand which button press/thumbstick motion triggers which in-game action).

Given this, if the user has difficulty in providing accurate thumbstick motions to video games, then it is most likely that those thumbstick motions which they find difficult to perform are cardinal and/or ordinal directions. Thus, it may be advantageous to provide interlocking sets 140 that define paths that are aligned with the cardinal and/or ordinal directions (that is, the most used directions in video games).

Alternatively or in addition, one or more of the predefined patterns correspond to thumbstick motions that are associated with a video game. Turning back to the fighting game example, the user may be provided with assistance in performing the quick succession thumbstick motions required for the special attack (that is, moving thumbstick 110 from the neutral position to a due east position and then to a due south position) by arranging a given set of guiding elements 122, 115 such that a path in the shape of the number 7 is formed therebetween. Thus, when the corresponding pin 114, 123 engages with this set of guiding elements 122, 115, the pin may travel along this path, and thereby cause thumbstick 110 to move in accordance with the quick succession of thumbstick motions, which in turn causes the user's in-game character to perform the special attack.

As will be appreciated by persons skilled in the art, this is a non-limiting example of game-specific paths. Other patterns may be defined which enable thumbstick 110 to move in accordance with other successions of motions that are required by a given video game in order to change the state thereof (that is, cause in-game actions to be performed, for example).

In any case, and as will be appreciated by persons skilled in the art, embodiments of the present description make the performance of controller inputs more accessible to users, as the guiding means thereof (that is, interlocking elements 140) define one or more directions that thumbstick 110 follows when its relative position (that is, its positon relative to its neutral position) falls within a predetermined range of thumbstick positions (which is also defined by the guiding means). As a result, the guiding means aid the user in the performance of thumbstick manipulations which they may find difficult, if not impossible, to perform otherwise (due to motor skill issues, discomfort, or the like), as the user may rely on the guiding means to limit any deviation in the motion of thumbstick 110 while the user pushes thumbstick 110 in one of the directions defined by the paths between guiding elements 122, 115.

Handheld Controller

As will be appreciated by persons skilled in the art, one or more user input devices 100 may be comprised within an input apparatus that is configured to generate one or more input signals based on the position of a given user input device's thumbstick relative to its neutral position. These inputs signals may be used to affect/control a state of an application/software (a video game, film, or the like) being executed on the input apparatus or an external apparatus. The input apparatus in question may be a handheld controller, a portable video game console, an arcade games machine, or the like.

Figure 8:
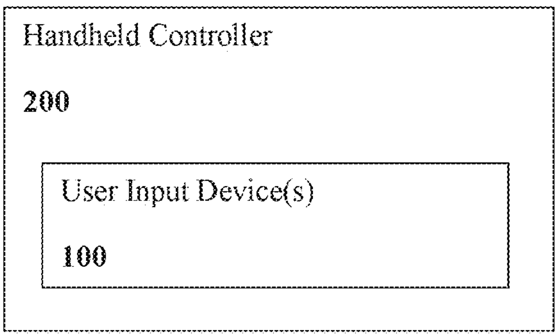
FIG. 8 schematically illustrates a handheld controller according to embodiments of the present description.

Thus, and turning now to FIG. 8, in embodiments of the present description, a handheld controller 200 may comprise one or more user input devices 100.

Figure 9:
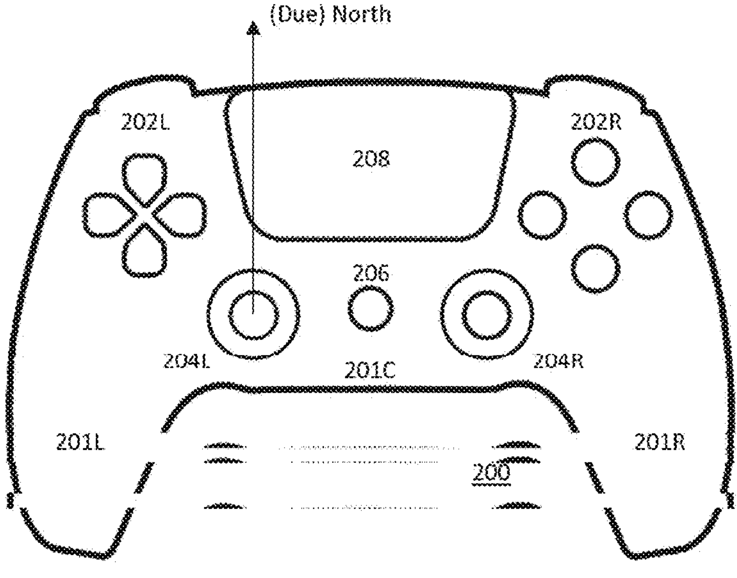
FIG. 9 schematically illustrates a DualSense® controller.

In FIG. 9, the DualSense® controller is illustrated as a non-limiting example of handheld controller 200. Such a controller typically has two handle sections 201L,R and a central body 201C. Various controls are distributed over the controller, typically in local groups. Examples include a left button group 202L, which may comprise directional controls and/or one or more shoulder buttons, and similarly right button group 202R, which comprise function controls and/or one or more shoulder buttons. The controller also includes left and/or right thumbsticks 204L,R, which may optionally also be operable as buttons by pressing down on them.

The controller (typically in the central portion of the device) may also comprise one or more system buttons 206, which typically cause interaction with an operating system of the entertainment device rather than with a game or other application currently running on it; such buttons may summon a system menu, or allow for recording or sharing of displayed content. Furthermore, the controller may comprise one or more other elements such as a touchpad 208, a light for optical tracking (not shown), a screen (not shown), haptic feedback elements (not shown), triggers (not shown), and the like.

Similarly with conventional controllers, the thumbsticks 204L,R may move in a (due) north direction, which, as mentioned previously, is defined as the thumbstick direction that is normal to and oriented towards the side of the Dualsense® controller that houses the shoulder buttons thereof, such a (due) north direction being depicted in FIG. 9.

As will be appreciated by persons skilled in the art, in order to realise the aforementioned advantages of embodiments of the present description, one or both thumbsticks 204L,R may be replaced with a respective user input device 100. This may be achieved by replacing the commonly known thumbstick(s) and thumbstick housing(s) with thumbstick 110 and housing 120 during manufacture of the DualSense® controller (or other handheld controllers).

Alternatively, one or more of the user input devices 100 may be detachably connectable to handheld controller 200. For example, the DualSense® Edge controller comprises removable thumbstick modules so that users may replace damaged/worn thumbstick modules. Thus, a user input device 100 may take the form of such a removable/replaceable thumbstick module, and users may connect one or more user input devices with their DualSense® Edge controller (or other handheld controller comprising detachable/removable/replaceable thumbstick modules).

Figure 7:
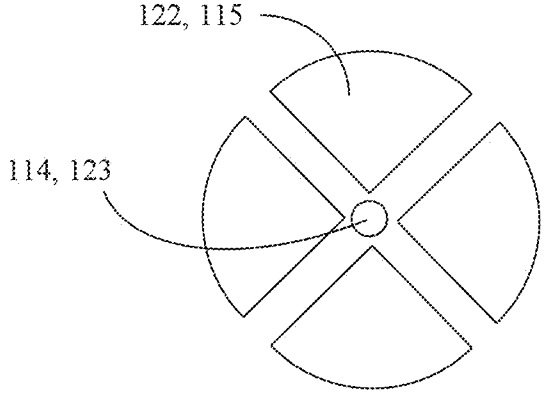
FIG. 7 schematically illustrates a non-limiting example of guiding means according to embodiments of the present description.

Such detachable user input devices 100 may be advantageous, as the user may swap in a given user input device 100 depending on the requirements of a given video game/application/software. For example, a first detachable user input device 100 may comprise guiding elements that form a cross pattern (as depicted in FIG. 2), and a second detachable user input device may comprise guiding elements that form a saltire pattern (as depicted in FIG. 7).

For a fighting game, the first detachable user input device 100 may enable users perform thumbstick motions in the cardinal directions more accurately/comfortably, whereas for a video game employing isometric graphics, the second detachable user input device 100 may enable users perform thumbstick motions in the ordinal directions more accurately/comfortably. If a given wants to play both these games within a given gaming session, then the user only has to swap in the second detachable user input device 100 for the first detachable user input device 100, or vice versa, rather than buying a new controller, for example.

Alternatively or in addition, a thumbstick may be provided with one or more pins 114, but without any guiding elements the or each pin does not affect operation of the thumbstick. However, the upper part of the housing 120, in the inner side of which the guiding elements may be positioned, may itself be removable. Hence for example different parts, resembling a convex annulus with one or more guiding elements beneath, may be clipped or screwed in or out of the housing of the controller/input device. Optionally such annular housing components may come in two or more parts so that they can be attached even if the thumbstick cap 111 is larger than the aperture of the annulus. In either case, replaceable annular housing components of this kind make it easier to customise the controller/input device to the needs of different games or applications. Hence also the controller and/or input device may form part of a kit comprising the controller and/or input device (and optionally also the entertainment device) and one or more such replaceable annular housing components, and/or similarly a physical copy of a software title may form part of a kit comprising the physical copy of the software program and one or more such replaceable annular housing components specific to the software title and configured to be used in the user input device.

Entertainment System

Figure 10:
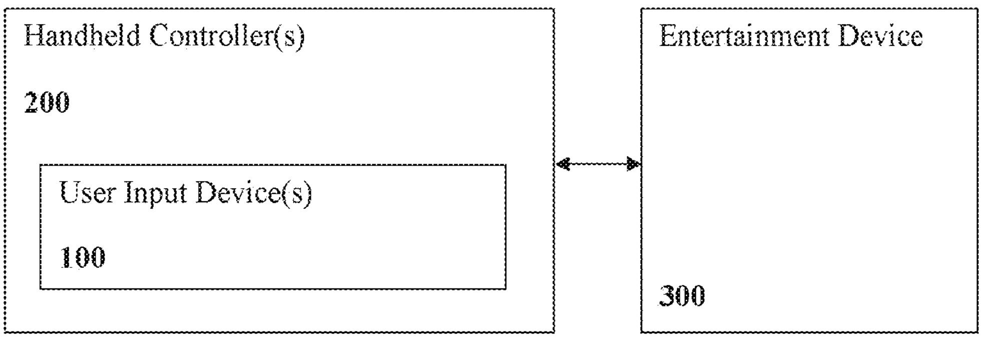
FIG. 10 schematically illustrates an entertainment system according to embodiments of the present description.

Turning now to FIG. 10, in embodiments of the present description, an entertainment system may comprise one or more handheld controllers 200, and entertainment device 300, where each handheld controller 200 may be configured to transmit one or more input signals to entertainment device 300 responsive to a given user input device's thumbstick position relative to the given user input device's neutral position.

As will be appreciated by persons skilled in the art, given that the thumbstick follow one or more distinct directions when the relative position of the thumbstick is within a predetermined range of thumbstick motions, the input signals transmitted to entertainment device 300 is likely to be based on the thumbstick moving in one of the distinct directions (unless the user applies sufficient force in a direction contrary to such directions). Such transmitted signals may then be used to affect/change the state of the application/software executed on the entertainment device (entertainment device 300 may cause the user's in-game character to perform the desired special attack due to the thumbstick moving in a due east direction with the assistance of the guiding means, for example).

Figure 11:
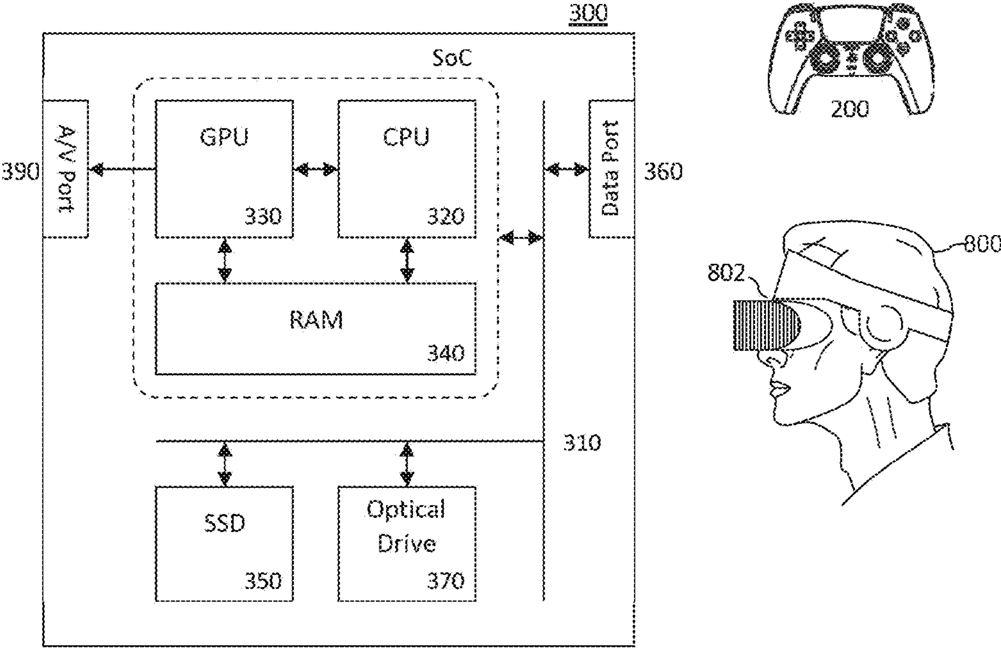
FIG. 11 schematically illustrates an entertainment device according to embodiments of the present description.

Turning now to FIG. 11, an example of an entertainment device 300 is a computer or console such as the Sony® PlayStation 5® (PS5).

The entertainment device 300 comprises a central processor 320. This may be a single or multi core processor, for example comprising eight cores as in the PS5. The entertainment system also comprises a graphical processing unit or GPU 330. The GPU can be physically separate to the CPU, or integrated with the CPU as a system on a chip (SoC) as in the PS5.

The entertainment device also comprises RAM 340, and may either have separate RAM for each of the CPU and GPU, or shared RAM as in the PS5. The or each RAM can be physically separate, or integrated as part of an SoC as in the PS5. Further storage is provided by a disk 350, either as an external or internal hard drive, or as an external solid state drive, or an internal solid state drive as in the PS5.

The entertainment device may transmit or receive data via one or more data ports 360, such as a USB port, Ethernet® port, WiFi® port, Bluetooth® port or similar, as appropriate. It may also optionally receive data via an optical drive 370.

Interaction with the system is typically provided using one or more handheld controllers 200, such as the DualSense® controller in the case of the PS5.

Audio/visual outputs from the entertainment device are typically provided through one or more A/V ports 390, or through one or more of the wired or wireless data ports 360.

Where components are not integrated, they may be connected as appropriate either by a dedicated data link or via a bus 310.

An example of a device for displaying images output by the entertainment system is a head mounted display 'HMD' 802, worn by a user 800.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A user input device, comprising:

a thumbstick;

a housing that partially encloses a base of the thumbstick without contacting the base so as to form a clearance between at least a part of an inner surface of the housing and at least a part of the base; and a guide for guiding the motion of the thumbstick to follow one or more distinct directions when a position of the thumbstick relative to a neutral position thereof falls within a predetermined range of thumbstick positions, at least a part of the guide being disposed within the clearance, the guide comprising one or more sets of interlocking elements, each set of interlocking elements comprising:

a pin disposed on one of the inner surface of the housing and the base, and a plurality of guiding elements disposed on the other of the inner surface of the housing and the base, the plurality of guiding elements being arranged so as to form one or more paths which the pin follows when the pin is engaged with the plurality of guiding elements, the one or more paths defining the one or more distinct directions, wherein at least one of the one or more sets of interlocking elements is configured such that the pin disengages from the plurality of guiding elements in response to a force exerted on the thumbstick being equal to or exceeding a threshold force and a direction of the force exerted on the thumbstick deviating from the one or more distinct directions.

2. A user input device according to claim 1, wherein, for at least one set of interlocking elements, the respective pin thereof, when engaged with the respective plurality of guiding elements thereof, is constrained to follow the one or more formed by the respective plurality of guiding elements thereof regardless of a magnitude and/or direction of a force exerted on the thumbstick.

3. A user input device according to claim 1, wherein, for each set of interlocking elements, the respective plurality of guiding elements thereof are disposed within a respective predetermined area of the other of the inner surface of the housing and the base, wherein a location and a geometry of the respective predetermined area defines a location and a geometry of at least a part of the predetermined range of thumbstick positions.

4. A user input device according to claim 1, wherein, for a given set of interlocking elements, the one or more paths formed by the respective plurality of guiding elements thereof comprise one or more predefined patterns.

5. A user input device according to claim 4, wherein one of the predefined patterns comprises a cross defining cardinal directions for the thumbstick to follow within the predetermined range of thumbstick position.

6. A user input device according to claim 4, wherein one of the predefined patterns comprises a saltire defining ordinal directions for the thumbstick to follow within the predetermined range of thumbstick position.

7. A user input device according to claim 4, wherein one or more of the predefined patterns correspond to thumbstick motions that are associated with a video game.

8. A user input device according to claim 1, wherein, for at least one set of interlocking elements, at least one of the pin thereof and the plurality of guiding elements thereof comprise a rounded or chamfered tip.

9. A user input device according to claim 1, wherein, for at least one set of interlocking elements, at least one of the pin thereof and the plurality of guiding elements thereof comprise one or more rounded or chamfered edges.

10. The user input device according to claim 1, wherein the respective pin and guiding elements are configured to elastically deform in response to the force exerted on the thumbstick being equal to or exceeding a threshold force.

11. The user input device according to claim 1, wherein the threshold force is a biasing force configured to act on the base of the thumbstick and maintain engagement between the respective pin and guiding elements.

12. The user input device according to claim 1, wherein the threshold force is a biasing force configured to act on the respective pin and maintain engagement between the pin and guiding elements.

13. An apparatus, comprising:

a handheld controller, which includes one or more user input devices, each user input device comprising:

a thumbstick;

a housing that partially encloses a base of the thumbstick without contacting the base so as to form a clearance between at least a part of an inner surface of the housing and at least a part of the base; and a guide for guiding the motion of the thumbstick to follow one or more distinct directions when a position of the thumbstick relative to a neutral position thereof falls within a predetermined range of thumbstick positions, at least a part of the guide being disposed within the clearance, the guide comprising one or more sets of interlocking elements, each set of interlocking elements comprising:

a pin disposed on one of the inner surface of the housing and the base, and a plurality of guiding elements disposed on the other of the inner surface of the housing and the base, the plurality of guiding elements being arranged so as to form one or more paths which the pin follows when the pin is engaged with the plurality of guiding elements, the one or more paths defining the one or more distinct directions, wherein at least one of the one or more sets of interlocking elements is configured such that the pin disengages from the plurality of guiding elements in response to a force exerted on the thumbstick being equal to or exceeding a threshold force and a direction of the force exerted on the thumbstick deviating from the one or more distinct directions.

14. The apparatus according to claim 13, wherein one or more of the user input devices are detachably connectable to the handheld controller.

15. The apparatus according to claim 13, further comprising:

computing device operatively connected to the handheld controller, wherein the handheld controller is configured to transmit one or more input signals to the computing device responsive to a given user input device's thumbstick position relative to the given user input device's neutral position.

16. The apparatus according to claim 13, further comprising multiple different user input devices that are each detachably connectable to the handheld controller.

17. The apparatus according to claim 15, further comprising multiple user input devices that are each detachably connectable to the handheld controller, wherein each user input device is configured to constrain movement of the thumbstick to one or more respective paths defined by an interactive application executed on the computing device.

18. The apparatus according to claim 13, wherein the respective pin and guiding elements are configured to elastically deform in response to the force exerted on the thumbstick being equal to or exceeding a threshold force.

19. The apparatus according to claim 13, wherein the threshold force is a biasing force configured to act on the base of the thumbstick and maintain engagement between the respective pin and guiding elements.

20. The apparatus according to claim 13, wherein the threshold force is a biasing force configured to act on the respective pin and maintain engagement between the pin and guiding elements.

* * * * *